(12) United States Patent
Seo et al.

(10) Patent No.: US 8,908,697 B2
(45) Date of Patent: Dec. 9, 2014

(54) METHOD FOR PRIORITIZING OPERATION OF RELAY NODE IN A WIRELESS COMMUNICATION SYSTEM AND APPARATUS FOR THE SAME

(75) Inventors: Han Byul Seo, Anyang-si (KR); Hak Seong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 279 days.

(21) Appl. No.: 13/381,360

(22) PCT Filed: Jun. 24, 2010

(86) PCT No.: PCT/KR2010/004101
§ 371 (c)(1),
(2), (4) Date: Dec. 28, 2011

(87) PCT Pub. No.: WO2011/002176
PCT Pub. Date: Jan. 6, 2011

(65) Prior Publication Data
US 2012/0106437 A1 May 3, 2012

Related U.S. Application Data

(60) Provisional application No. 61/222,062, filed on Jun. 30, 2009.

(51) Int. Cl.
*H04L 12/28* (2006.01)
*H04L 12/56* (2006.01)
*H04B 7/155* (2006.01)
*H04W 72/12* (2009.01)
*H04W 84/04* (2009.01)

(52) U.S. Cl.
CPC ........... *H04B 7/15542* (2013.01); *H04W 72/12* (2013.01); *H04W 72/1247* (2013.01); *H04W 72/1257* (2013.01); *H04W 84/047* (2013.01)
USPC .................................. 370/395.4; 370/395.42

(58) Field of Classification Search
CPC ....... H04J 3/00; H04L 5/0091; H04L 5/0092; H04L 5/0094; H04L 5/0096; H04L 5/0005; H04L 5/0007; H04L 5/0001; H04W 72/12; H04W 72/247; H04W 74/00; H04W 74/002; H04W 74/004; H04W 74/006
USPC .......... 370/252, 315, 336, 347, 395.4, 395.42
See application file for complete search history.

(56) References Cited

U.S. PATENT DOCUMENTS 8,135,335 B2 * 3/2012 Kang et al. ......................... 455/7
8,472,337 B2 * 6/2013 Johansson et al. ............ 370/252

(Continued)

FOREIGN PATENT DOCUMENTS

JP 2007-006199 1/2007
WO 2008/050425 5/2008

OTHER PUBLICATIONS

Nortel, "Control Channel and Data Channel Design for Relay Link in LTE-Advanced," 3GPP TSG-RAN Working Group 1 Meeting #56, R1-090753, Feb. 2009, 9 pages.

(Continued)

*Primary Examiner* — Farah Faroul
(74) *Attorney, Agent, or Firm* — Lee, Hong, Degerman, Kang & Waimey

(57) ABSTRACT

Various methods and apparatuses for prioritizing operation of Relay Node are disclosed. A method for prioritizing the transmission and receipt of uplink signals in a relay node of a wireless communication system is presented. The method comprises determining radio resource requirements for receiving one or more access link signals and/or transmitting one or more backhaul link signal, determining the signal type of the one or more access link signals and/or determining the signal type of the one or more backhaul link signals, and selecting one of a transmitting mode operation and a receiving mode operation based on the radio resource requirements for receiving the one or more access link signals and/or transmitting the one or more backhaul link signals, and based on the signal type of the one or more access link signals and/or the signal type of the one or more backhaul link signals.

10 Claims, 12 Drawing Sheets

(56) References Cited

U.S. PATENT DOCUMENTS

| | | |
|---|---|---|
| 2008/0186950 A1 | 8/2008 | Zhu et al. |
| 2009/0011784 A1* | 1/2009 | Kang et al. .................... 455/517 |
| 2010/0091672 A1* | 4/2010 | Ishii .............................. 370/252 |
| 2010/0128680 A1* | 5/2010 | Coletti et al. ................. 370/329 |
| 2010/0150022 A1* | 6/2010 | Cai et al. ....................... 370/254 |
| 2010/0150173 A1* | 6/2010 | Yu et al. ........................ 370/474 |
| 2010/0238854 A1* | 9/2010 | Kazmi et al. .................. 370/315 |
| 2010/0304665 A1* | 12/2010 | Higuchi ............................ 455/7 |
| 2011/0111693 A1* | 5/2011 | Nakao et al. ...................... 455/9 |
| 2011/0158156 A1* | 6/2011 | Ma et al. ....................... 370/315 |
| 2011/0222428 A1* | 9/2011 | Charbit et al. ................ 370/252 |
| 2011/0317614 A1* | 12/2011 | Park et al. ..................... 370/315 |
| 2012/0002568 A1* | 1/2012 | Tiirola et al. ................. 370/252 |
| 2012/0320820 A1* | 12/2012 | Yuda et al. .................... 370/315 |
| 2013/0028098 A1* | 1/2013 | Yuda et al. .................... 370/241 |
| 2013/0208669 A1* | 8/2013 | Pan et al. ...................... 370/329 |
| 2014/0050144 A1* | 2/2014 | Ma et al. ....................... 370/315 |

OTHER PUBLICATIONS

Nokia, et al., "Text proposal on backhaul resource assignment," 3GPP TSG RAN WG1 Meeting #57, R1-092249, May 2009, 1 page.

ZTE, "Approach for Selecting Relay Operation Mode Based on User Traffic Types", R1-091439, TSG-RAN WG1 #56-bis, Mar. 2009.

Nortel, "Proportional Fairness Scheduling for System Level Evaluation of Multi-hop Cellular Systems", R1-091392, 3GPP TSG RAN WG1 Meeting #56b, Mar. 2009.

* cited by examiner

METHOD FOR PRIORITIZING OPERATION OF RELAY NODE IN A WIRELESS COMMUNICATION SYSTEM AND APPARATUS FOR THE SAME

CROSS-REFERENCE TO RELATED APPLICATIONS

This application is the National Stage filing under 35 U.S.C. 371 of International Application No. PCT/KR2010/004101, filed on Jun. 24, 2010, which claims the benefit of U.S. Provisional Application Ser. No. 61/222,062, filed on Jun. 30, 2009, the contents of which are all incorporated by reference herein in their entirety.

TECHNICAL FIELD

The present invention relates to a wireless communication system, and more particularly, to a method for prioritizing operation of Relay Node and an apparatus through which the method can be carried out.

BACKGROUND ART

FIG. 1 illustrates a wireless communication system 100. Referring to FIG. 1, wireless communication system 100 may include eNodeB (eNB) 110, Relay Node (RN) 120 and User Equipments (UEs) 131 and 132. Hereinafter, UE 131 served directly by eNB 110 is referred to as Macro-UE, and UE 132 served by RN 120 is referred to as Relay-UE. Generally, RN 120 delivers signals from Relay-UE 132 to eNB 110, or signals from eNB 110 to Relay-UE 132. Further, RN 120 supports improvements of wireless communication system 100, such as expanding the coverage of high data rates, group mobility, temporary network deployment, the cell-edge throughput and providing coverage in new areas.

FIG. 2 illustrates links between eNB and RN, and links between RN and UE. Referring to FIG. 2, RN may be wirelessly connected to eNB via Un interface, and radio link between RN and eNB is referred to as Backhaul Link. Backhaul Downlink is a radio link from eNB to RN, and Backhaul Uplink is a radio link from RN to eNB. Further, RN may be wirelessly connected to UE via Uu interface, and radio link between RN and UE is referred to as Access Link. Access Downlink is a radio link from RN to UE, and Access Uplink is a radio link from UE to RN.

Backhaul link may operate in the same frequency band as the access link, which is referred to as 'In-band.' On the other hand, backhaul link may operate in different frequency band from the access link, which is referred to as 'Out-band.'

In case of In-band RN, if receiving backhaul downlink signal and transmitting access downlink signal are performed at the same time on the same frequency band, signal transmitted from the RN transmitter can be received at the RN receiver. Similarly, if RN receives access uplink signal and transmits backhaul uplink signal simultaneously on the same frequency band, signal transmitted from the RN transmitter can be received at the RN receiver. Accordingly, interference occurs due to the RN transmitter causing interference to its own receiver. To avoid such interference, resource partitioning for RN can be considered. Namely, it is required that transmitting and receiving on the same frequency band do not take place simultaneously in RN operation. For resource partitioning, RN may operate in half-duplex mode. For example, In-band RN may transmit backhaul uplink signal in a certain time slot (subframe), and receive access uplink signal in another time slot (subframe). In other words, backhaul link and access link transmission/reception are multiplexed with Time Division Multiplexing (TDM) scheme.

DISCLOSURE

Technical Problem

As explained above, RN cannot receive and transmit simultaneously on the same frequency band in most cases. This is also because simultaneous transmission and reception functionality requires high complexity in RN's operation, thereby increasing the deployment cost.

In operation of half-duplex RN, conflict may occur between the backhaul uplink transmission and the access uplink reception (or between the access downlink transmission and the backhaul downlink reception) at a certain time slot (subframe) on the same frequency band. As a half-duplex RN should be in either transmission or reception mode, a conflict resolution method is required when both the backhaul link transmission (reception) and the access link reception (transmission) are scheduled at the same time slot.

Accordingly, the present invention is directed to a method for prioritizing operation in RN, which substantially obviates one or more problems due to limitations and disadvantages of the related art.

An object of the present invention is to provide method and apparatus for prioritization of operation of RN for backhaul link/access link transmission/reception to utilize resource more efficiently.

Another object of the present invention is to provide method and apparatus for prioritization of operation of RN for backhaul link/access link transmission/reception with reduced latency and/or retransmission.

Still another object of the present invention is to provide a method and an apparatus for prioritization of RN backhaul link/access link transmission/reception to avoid loss of signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, the present invention discloses a method and an apparatus for prioritizing operation in Relay Node.

In a first aspect of the present invention, a method for prioritizing the transmission and receipt of uplink signals in a relay node of a wireless communication system is presented. The method comprises determining radio resource requirements for receiving one or more access link signals and/or transmitting one or more backhaul link signal, determining the signal type of each of the one or more access link signals and/or the signal type of each of the one or more backhaul link signals scheduled in a radio resource, and selecting one of a transmitting mode operation and a receiving mode operation for the radio resource based on the radio resource requirements for receiving the one or more access link signals and/or transmitting the one or more backhaul link signals, and based on the signal type of each of the one or more access link signals and/or the signal type of each of the one or more backhaul link signals scheduled in the radio resource.

In one feature, determining the radio resource requirements for receiving the one or more access link signals comprises measuring access link utilization for receiving the one or more access link signals during a transmission time interval.

In another feature, determining the radio resource requirements for transmitting the one or more backhaul link signals comprises determining the feedback/transmission period for a backhaul control type 2 signal.

In yet another feature, the one or more access link signals and/or the one or more backhaul link signals are one or more of a data signal, a control type 1 signal, and a control type 2 signal.

In still another feature, the method further comprises receiving the one or more access link signals or transmitting the one or more backhaul link signals on the radio resource based on the radio resource requirements for receiving the one or more access link signals and/or transmitting the one or more backhaul link signals, and based on the signal type of each of the one or more access link signals and/or the signal type of each of the one or more backhaul link signals scheduled in the radio resource.

In a second aspect of the present invention, a relay node in a wireless communication system is presented. The relay node comprises a receive module, a transmit module, and a processor in communication with the receive module and the transmit module, the processor configured to determine the radio resource requirements needed for receiving one or more access link signals with the receive module and/or transmitting one or more backhaul link signals using the transmit module, to determine the signal type of each of the one or more access link signals and/or each of the one or more backhaul link signals scheduled in a radio resource, and to select one of a transmitting mode operation and a receiving mode operation for the radio resource based on the radio resource requirements for receiving the one or more access link signals and/or transmitting the one or more backhaul link signals and based on the signal type of each of the one or more access link signals and/or the signal type each of the one or more backhaul link signals scheduled in the radio resource.

In one feature, the processor further comprises a calculation module configured to measure access link utilization for receiving the one or more access link signals during a transmission time interval, wherein the processor determines the radio resource requirements needed for receiving the one or more access link signals based on the measured access link utilization for receiving the one or more access link signals.

In another feature, the processor further comprises a calculation module configured to determine the feedback/transmission period for at least one backhaul control type 2 signal, wherein the processor determines the radio resource requirements for transmitting the at least one backhaul link signal based on the feedback/transmission period of the at least one backhaul control type 2 signal.

In yet another feature, the one or more access link signals and/or the one or more backhaul link signals are one or more of a data signal, a control type 1 signal, and a control type 2 signal.

In still another feature, the processor further comprises a control module configured to control the receive module to receive the one or more access link signals or to control the transmit module to transmit the one or more backhaul link signals on the radio resource based on the radio resource requirements needed for receiving the one or more access link signals and/or transmitting the one or more backhaul link signals, and based on the signal type of each of the one or more access link signals and/or the signal type of each of the one or more backhaul link signals scheduled in the radio resource.

It is to be understood that both the foregoing general description and the following detailed description of the present invention are exemplary and explanatory and are intended to provide further explanation of the invention as claimed.

Advantageous Effects

According to the embodiments of the present invention, the following advantages can be obtained.

In RN operation of backhaul link/access link transmission/reception, resources can be efficiently utilized, latency can be reduced, retransmission can be avoided, and loss of signal can be avoided.

It is to be understood that the effects that can be obtained by the present invention are not limited to the aforementioned effects, and another effects, which are not described, will be apparent to those with ordinary skill in the art to which the present invention pertains, from the following detailed description of the present invention. Namely, effects which are not intended in the embodiments of the present invention can be derived from the embodiments of the present invention by those with ordinary skill in the art.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Figure 1:
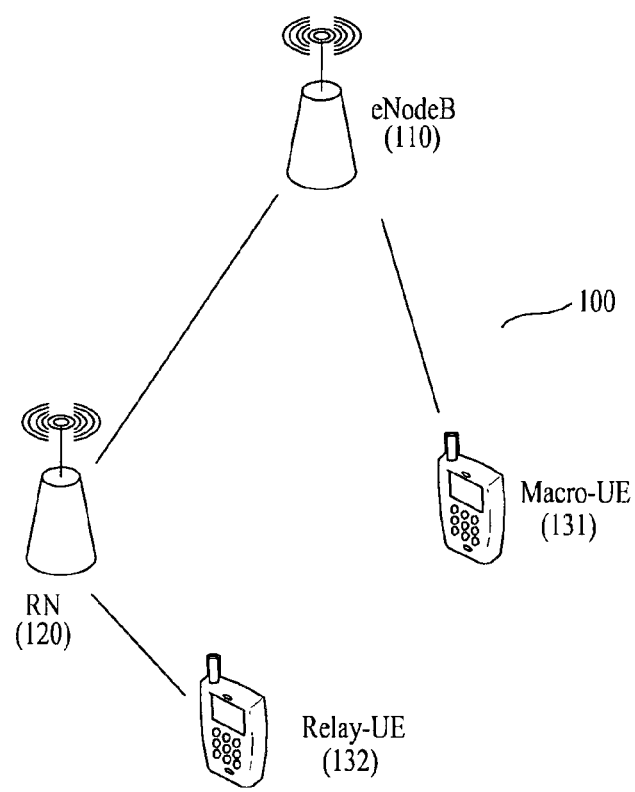
FIG. 1 is a diagram illustrating a wireless communication system.
Figure 2:
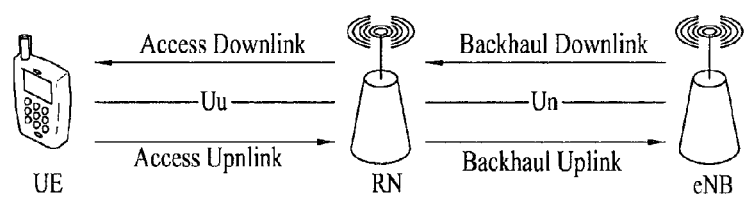
FIG. 2 is a diagram illustrating links between eNB and RN, and links between RN and UE.

Reference will now be made in detail to the preferred embodiments of the present invention, examples of which are illustrated in the accompanying drawings. Wherever possible, the same reference numbers will be used throughout the drawings to refer to the same or like parts.

Hereinafter, the embodiments of the present invention disclose methods and apparatus for prioritizing operation in RN.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of the drawings, procedures or steps that may make the subject matter of the present invention obscure will be omitted, and procedures or steps that can be understood by the person with ordinary skill in the art will be omitted. However, it will be apparent that procedures or steps which are not illustrated can be predicted by those skilled in the art within an apparent range.

The embodiments of the present invention have been described based on the signal transmission and reception between a base station and a relay node, and between a relay node and a mobile station.

In this case, the base station means a terminal node (TN) of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes (NNs) along with the base station may be performed by the base station or network nodes other than the base station. The term of the base station may be replaced with one of terms such as a fixed station, Node B, eNode B (eNB), an advanced base station (ABS) and access point. The term of the relay node (RN) may be replaced with one of terms such as relay and relay station (RS). Also, the term of the mobile station may be replaced with one of terms such as a user equipment (UE), a subscriber station (SS), a mobile subscriber station (MSS), a mobile terminal (MS), an advanced mobile station (AMS) and a terminal.

Furthermore, a transmitting side means a fixed and/or mobile node that provides data services or voice services while a receiving side means a fixed and/or mobile node that receives data services or voice services. Accordingly, in an uplink, the mobile station could be a transmitting side while the base station could be, a receiving side. Likewise, in a downlink, the mobile station could be a receiving side while the base station could be a transmitting side.

The embodiments of the present invention can be supported by standard documents disclosed in at least one of wireless access systems, i.e., IEEE 802.xx system, 3GPP system, 3GPP LTE system, 3GPP LTE-A (LTE-Advanced) system, and 3GPP2 system. Namely, among the embodiments of the present invention, apparent steps or parts which are not described can be described with reference to the above standard documents.

Also, all terminologies disclosed herein can be described by the above standard documents. Particularly, the embodiments of the present invention can be supported by one or more of standard documents of 3GPP LTE (release 8 or release 9), and 3GPP LTE-A.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

Specific terminologies hereinafter used in the embodiments of the present invention are provided to assist understanding of the present invention, and various modifications can be made in the specific terminologies within the range that they do not depart from technical spirits of the present invention.

Techniques, apparatus and systems described herein can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advance (LTE-A) is an evolution of the 3GPP LTE. For clarity, this application focuses on the 3GPP LTE/LTE-A. However, technical features of the present invention are not limited thereto.

Figure 3:
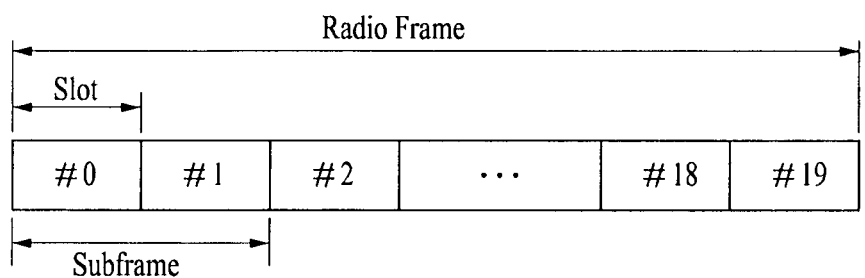
FIG. 3 is a diagram illustrating structure of a radio frame.

FIG. 3 illustrates structure of a radio frame of 3GPP LTE system.

In FIG. 3, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 4:
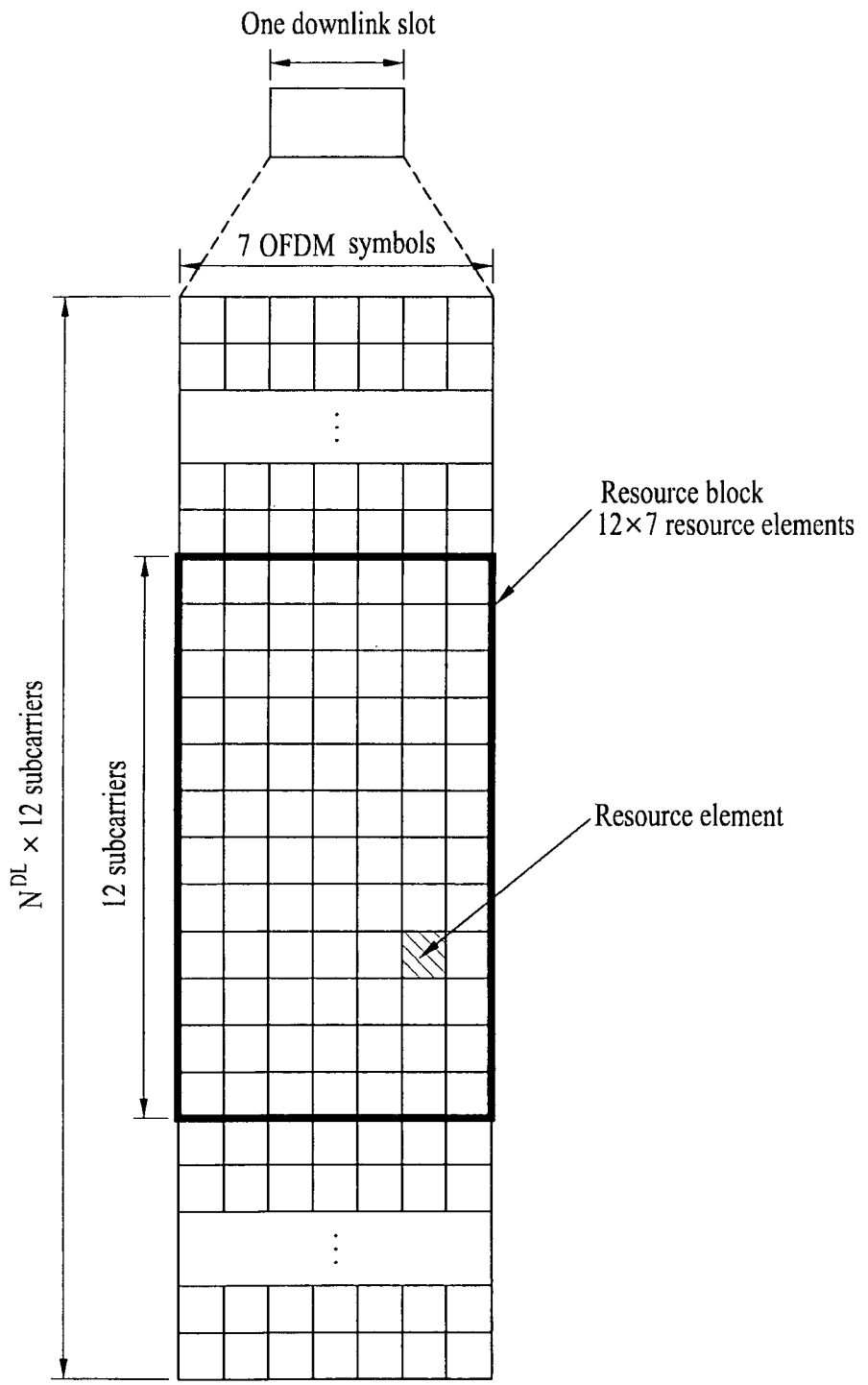
FIG. 4 is a diagram illustrating resource grid for one downlink slot.

FIG. 4 illustrates resource grid for one downlink slot.

In FIG. 4, a downlink slot includes a plurality of OFDM symbols in time domain. It is described herein that one downlink slot includes 7 OFDM symbols, and one resource block (RB) includes 12 subcarriers in frequency domain as an example. However, the present invention is not limited thereto. Each element on the resource grid is referred to as a resource element. One RB includes 12×7 resource elements. The number NDL of RBs included in the downlink slot depends on a downlink transmit bandwidth. The structure of an uplink slot may be same as that of the downlink slot.

Figure 5:
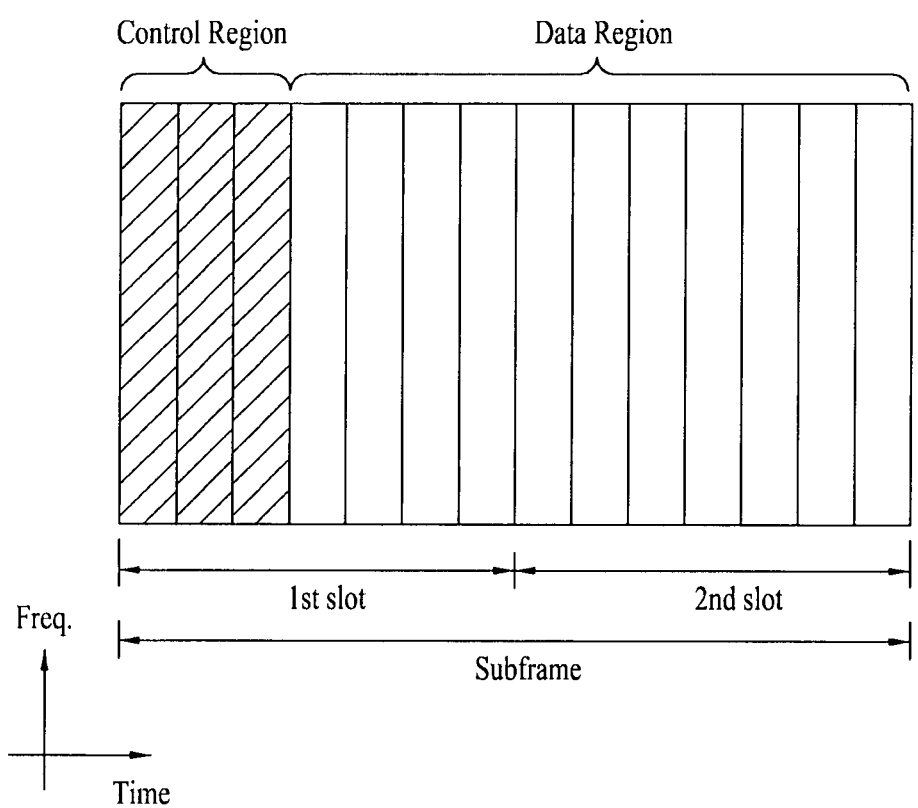
FIG. 5 is a diagram illustrating structure of downlink subframe.

FIG. 5 illustrates structure of downlink subframe.

In FIG. 5, a maximum of three OFDM symbols located in a front portion of a 1st slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 6:
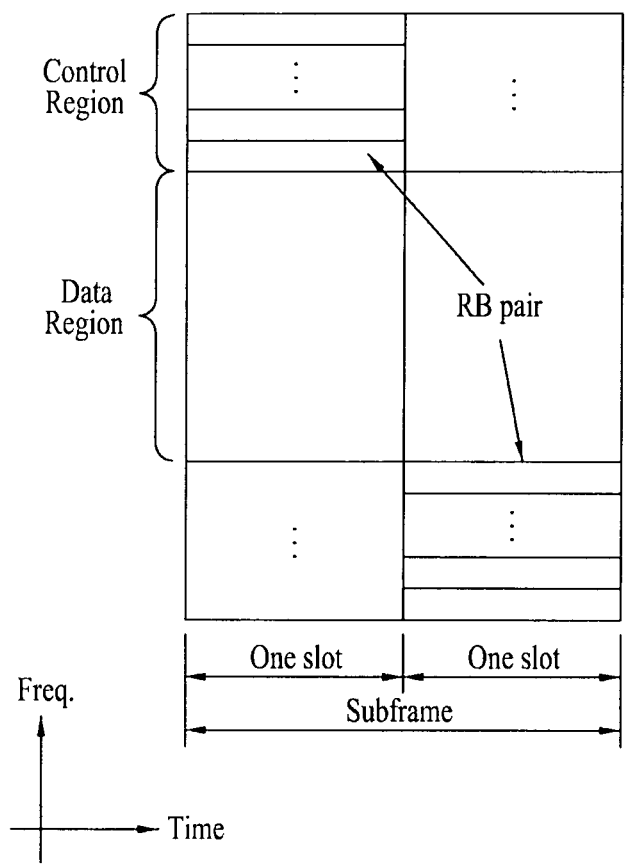
FIG. 6 is a diagram illustrating structure of uplink subframe.

FIG. 6 illustrates structure of uplink subframe.

In FIG. 6, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Referring back to FIG. 1, RN 120 may control cells, each of which appears to Relay-UE 132 as a separate cell distinct from the donor cell (eNB 110) and have unique physical layer identity and the same Radio Resource Management (RRM) mechanisms as normal eNB, so the RN 120 may appear as normal eNB to a certain Relay-UE (specifically, 3GPP LTE release 8 UE). Thus, the above general descriptions of downlink and uplink channels can be applied to access link (radio link between RN and Relay-UE).

Meanwhile, backhaul link (radio link between eNB and RN) may support similar subframe structure as described above. Backhaul downlink and uplink physical channels may include PDCCH, PDSCH, PUCCH and PDSCH. For example, PDCCH for RN is used to assign resources for the backhaul downlink data or to assign resources for backhaul uplink data. To distinguish backhaul link physical channels from access link physical channels, channels for RN may be referred to as R-channels (Relay-channels). R-channels may be designed to have channel structure optimized for the backhaul link channels differently from channels between eNB and Macro-UE. For example, PDCCH for RN (PDCCH on backhaul downlink) is referred to as R-PDCCH (Relay-PDCCH) and it can be designed such that its channel structure is optimized for the backhaul link channels differently from that of PDCCH transmitted from eNB to Macro-UE. Similarly, PDSCH for RN, PUCCH for RN and PUSCH for RN are referred to as R-PDSCH, R-PUCCH and R-PUSCH, respectively.

As explained above, in operation of half-duplex RN, the backhaul uplink transmission and the access uplink reception (or the access downlink transmission and the backhaul downlink reception) on the same frequency band should not take place simultaneously. Therefore, a half-duplex RN should be in either transmission or reception mode at a certain time slot (subframe) at a frequency band. Further, a conflict resolution method is required to determine which of the backhaul link or access link signal is to be transmitted/received when both the backhaul link transmission (reception) and the access link reception (transmission) are scheduled at the same time slot.

According to various embodiments of the present invention, resolution for the aforementioned conflict between transmission mode and reception mode of RN is provided. RN's transmission mode or reception mode can be determined by prioritizing signals to be transmitted/received according to their properties. Properties of signals may include the direction of signal (i.e., backhaul link or access link) and the contents of signal (i.e., data or control signal). RN may operate in transmission mode or reception mode at a certain time slot (subframe) in a frequency band. Thus, a half-duplex RN can operate either transmission mode or reception mode according to the highest priority of the signal to be transmitted/received, which solves aforementioned conflict.

In RN operation, uplink signals can be categorized into two types according to the direction of the signals, i.e., (1) 'Backhaul' uplink (from RN to eNB) and (2) 'Access' uplink (from Relay-UE to RN). In addition, the uplink signals can be categorized into three types according to the contents of the signals, i.e., (1) 'Data' such as PUSCH and Relay-PUSCH (R-PUSCH), (2) 'Control 1' which is related to data transmission and scheduling decision such as ACK/NACK and scheduling request (SR), and (3) 'Control 2' which is related to the channel state information such as channel state information (CSI) feedback and sounding reference signal (SRS).

According to the above categorization of signals, the rules of prioritization in the various embodiments of present invention can be determined as follows:

(1) Backhaul link signal has higher priority than access link signal. Rule (1) takes into account that backhaul link resource is the bottleneck of the relaying system performance in many cases since backhaul link resource should be shared with other RNs and Macro-UEs.

(2) Data signal (PUSCH and R-PUSCH) has higher priority than control signal (e.g. ACK/NACK, SR, CSI feedback, SRS, etc.), as data signal generally requires more resources than control signal.

(3) Control 1 (ACK/NACK and/or SR) has higher priority than Control 2 (CSI feedback and/or SRS), as Control 1 is directly related to data signal so unnecessary retransmission and/or scheduling latency is caused if it is lost.

(4) When more than one signal are aggregated (multiplexed) in a single signal, the highest priority among the constituent signals is assigned to the aggregated signal. For example, if backhaul data (R-PUSCH) and backhaul CSI feedback are multiplexed together in a single subframe, the priority of the backhaul data (the higher one) is applied to the multiplexed signal.

(5) The same rules are also applied in case the backhaul or access data is re-transmitted if there are no other priority rules.

In the following description of various embodiments of the present invention, prioritizing uplink signal will be mainly discussed for clarity, but it is not limited thereto. It should be noted that similar principal and criteria for prioritizing uplink signals can be applied to prioritizing downlink signals.

Embodiment 1

Embodiment 1 defines the signal priority as follows:
Backhaul Data>Backhaul Control 1>Access Data>Access Control 1>Backhaul Control 2>Access Control 2

RN may have various signals scheduled to transmit and/or to receive at a given subframe. RN may determine priority of scheduled signals according to the above priority order. According to such prioritization, RN may clearly determine its operation mode at a certain time slot (subframe) and may not suffer conflict between backhaul uplink signal transmission and access uplink reception on the same frequency band.

Specifically, Backhaul Data signal (i.e., R-PUSCH) has the highest priority. Thus, if RN receives UL backhaul grant via relay-PDCCH (R-PDCCH) at a subframe where PUSCH transmission is scheduled for a Relay-UE, RN transmits R-PUSCH according to the R-PDCCH while ignoring the PUSCH reception.

Backhaul Control 1 (i.e., backhaul ACK/NACK and/or SR) has higher priority than any other access link signals, but Backhaul Control 2 (i.e., backhaul CSI feedback and/or SRS) has lower priority than Access data (PUSCH) and Access Control 1 (access ACK/NACK and SR). Thus, if RN is scheduled to transmit backhaul CSI feedback at a subframe where a subordinate Relay-UE transmits access link ACK/NACK, RN receives the access link ACK/NACK while ignoring the backhaul transmission unless R-PUSCH, backhaul ACK/NACK, or backhaul SR is scheduled at that subframe together.

RN's operation mode in this embodiment is summarized in Table 1.

TABLE 1

|  | Backhaul data | Backhaul Control 1 | Backhaul Control 2 | Access data | Access control 1 | Access control 2 | RN operation mode |
|---|---|---|---|---|---|---|---|
| 1-(1) | X | X | X | X | X | O | RX |
| 1-(2) | X | X | X | X | O | — | RX |
| 1-(3) | X | X | X | O | — | — | RX |
| 1-(4) | X | X | O | X | X | O | TX |
| 1-(5) | X | X | O | X | O | — | RX |
| 1-(6) | X | X | O | O | — | — | RX |
| 1-(7) | X | O | — | X | X | O | TX |
| 1-(8) | X | O | — | X | O | — | TX |
| 1-(9) | X | O | — | O | — | — | TX |
| 1-(10) | O | — | — | X | X | O | TX |
| 1-(11) | O | — | — | X | O | — | TX |
| 1-(12) | O | — | — | O | — | — | TX |

In Table 1, 'X' is for the signal not scheduled at a given subframe, 'O' is for the signal scheduled at the subframe. Meanwhile, '—' is for the signal that is not taken into account. For example, in case 1-(6), if Access Data is scheduled at the subframe, Access Data is received regardless of scheduling status of Access Control 1 and/or Access Control 2. This operation is related to above rule (4). Specifically, when Backhaul Control 2 (e.g. backhaul CSI feedback) is scheduled at a given subframe, if Access Control 2 (e.g. Access CSI feedback) alone is scheduled at that subframe then RN ignores reception of Access Control 2, however, if Access Control 2 is multiplexed with Access Data (e.g. PUSCH) at that subframe then RN receives multiplexed access signal and does not transmit Backhaul Control 2.

In addition, 'RX' means RN's Receiving mode (i.e., receiving access uplink signal), while 'TX' means RN's Transmitting mode (i.e., transmitting backhaul uplink signal). For example, RN transmits Backhaul Control 2 signal in case 1-(4). RN receives Access Control 1 signal in case 1-(5) regardless of Access Control 2.

Figure 7:
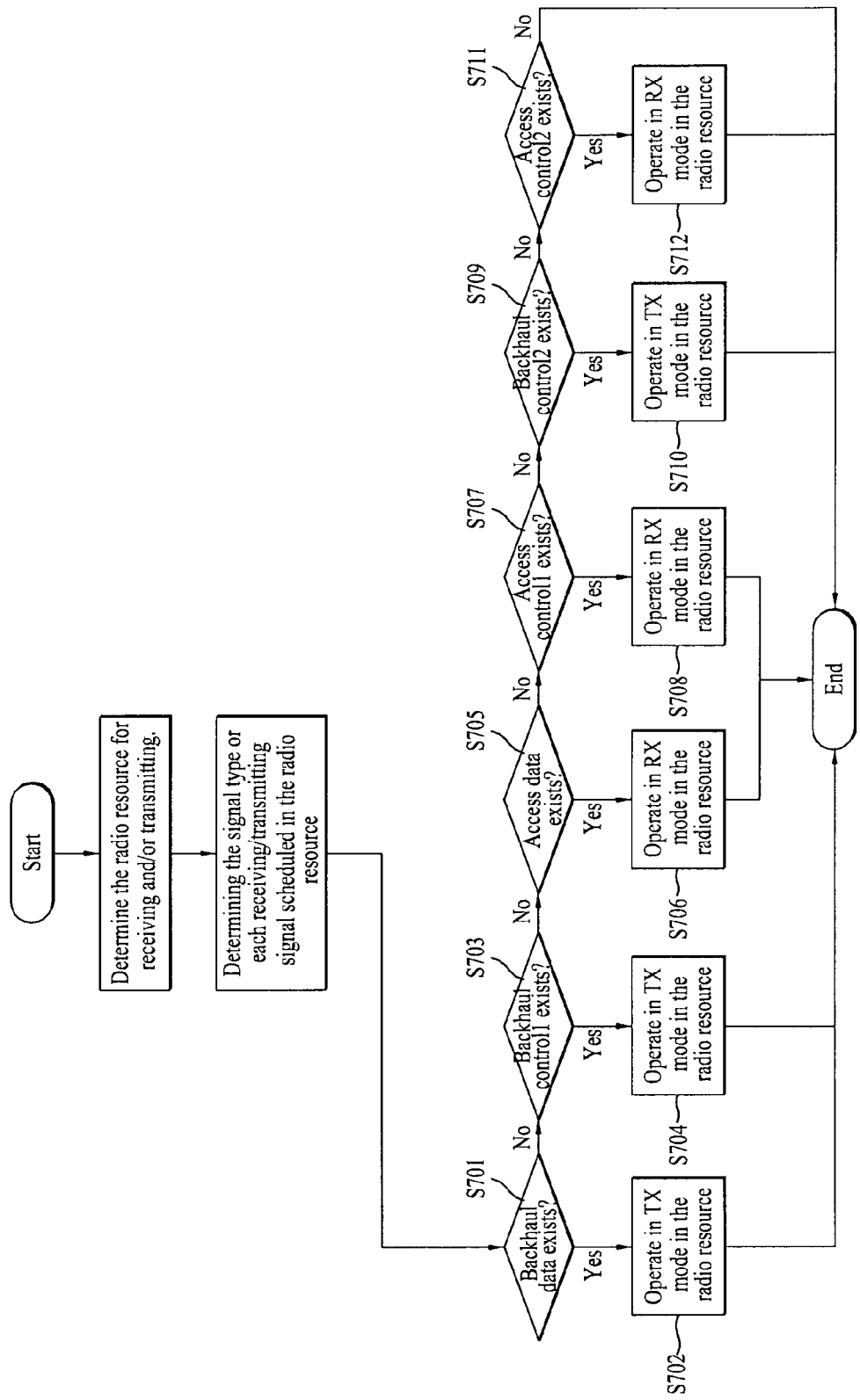
FIG. 7 is a flowchart for RN operation according to an embodiment of the present invention.

FIG. 7 is a flowchart for RN operation according to the embodiment 1.

Since RN may have various signals scheduled to transmit and/or to receive in a given radio resource (at a given subframe on a given frequency band), determining the radio resource for receiving and/or transmitting is performed. Then, determining the signal type of each receiving/transmitting signal scheduled in the given radio resource is performed in order to determine priority of scheduled signals.

First, it is determined whether the signal type of Backhaul Data is scheduled in the given radio resource (S701). If the signal type of Backhaul Data is scheduled in the given radio resource, RN operates in TX mode in the radio resource (S702).

If the signal type of Backhaul Data is not scheduled in the given radio resource, then it is determined whether the signal type of Backhaul Control 1 is scheduled in the given radio resource or not (S703). If the signal type of Backhaul Control 1 is scheduled in the radio resource, RN operates in TX mode in the radio resource (S704).

If the signal type of Backhaul Control 1 is not scheduled in the given radio resource, then it is determined whether the signal type of Access Data is scheduled in the given radio resource (S705). If the signal type of Access Data is scheduled in the given radio resource, RN operates in RX mode in the radio resource (S706).

If the signal type of Access Data is not scheduled in the given radio resource, then it is determined whether the signal type of Access Control 1 is scheduled in the given radio resource (S707). If the signal type of Access Control 1 is scheduled in the given radio resource, RN operates in RX mode in the radio resource (S708).

If the signal type of Access Control 1 is not scheduled in the given radio resource, then it is determined whether the signal type of Backhaul Control 2 is scheduled in the given radio resource (S709). If the signal type of Backhaul Control 2 is scheduled in the given radio resource, RN operates in TX mode in the radio resource (S710).

If the signal type of Backhaul Control 2 is not scheduled in the given radio resource, then it is determined whether the signal type of Access Control 2 is scheduled in the given radio resource (S711). If the signal type of Access Control 2 is scheduled in the given radio resource, RN operates in RX mode in the radio resource (S712).

If the signal type of Access Control 2 is not scheduled in the given radio resource, RN may terminate the signal prioritizing operation in the given radio resource.

Embodiment 2

Embodiment 2 defines the signal priority as follows:
Backhaul data>Access data>Backhaul control 1>Access control 1>Backhaul control 2>Access control 2

In embodiment 2, Access Data signal (i.e., PUSCH) has higher priority than Backhaul Control 1 (i.e., backhaul ACK/NACK and/or SR). Thus, if RN is scheduled to transmit backhaul ACK/NACK and/or SR at a given subframe where a subordinate Relay-UE transmits access link PUSCH, RN receives the access link PUSCH while ignoring the backhaul transmission unless R-PUSCH (backhaul data signal) is scheduled at that subframe together.

According to prioritization scheme of embodiment 2, RN may clearly determine its operation mode at a certain time slot (subframe) and may not suffer conflict between backhaul uplink signal transmission and access uplink reception on the same frequency band.

RN's operation mode in this embodiment is summarized in Table 2.

TABLE 2

| | Backhaul data | Backhaul Control 1 | Backhaul Control 2 | Access data | Access control 1 | Access control 2 | RN operation mode |
|---|---|---|---|---|---|---|---|
| 2-(1) | X | X | X | X | X | O | RX |
| 2-(2) | X | X | X | X | O | — | RX |
| 2-(3) | X | X | X | O | — | — | RX |
| 2-(4) | X | X | O | X | X | O | TX |
| 2-(5) | X | X | O | X | O | — | RX |
| 2-(6) | X | X | O | O | — | — | RX |
| 2-(7) | X | O | — | X | X | O | TX |
| 2-(8) | X | O | — | X | O | — | TX |
| 2-(9) | X | O | — | O | — | — | RX |
| 2-(10) | O | — | — | X | X | O | TX |
| 2-(11) | O | — | — | X | O | — | TX |
| 2-(12) | O | — | — | O | — | — | TX |

Compared to case 1-(9) of Table 1 of embodiment 1 where RN operates in TX mode transmitting Backhaul Control 1, RN operates RX mode receiving Access Data in case 2-(9) of Table 2 of embodiment 2.

Figure 8:
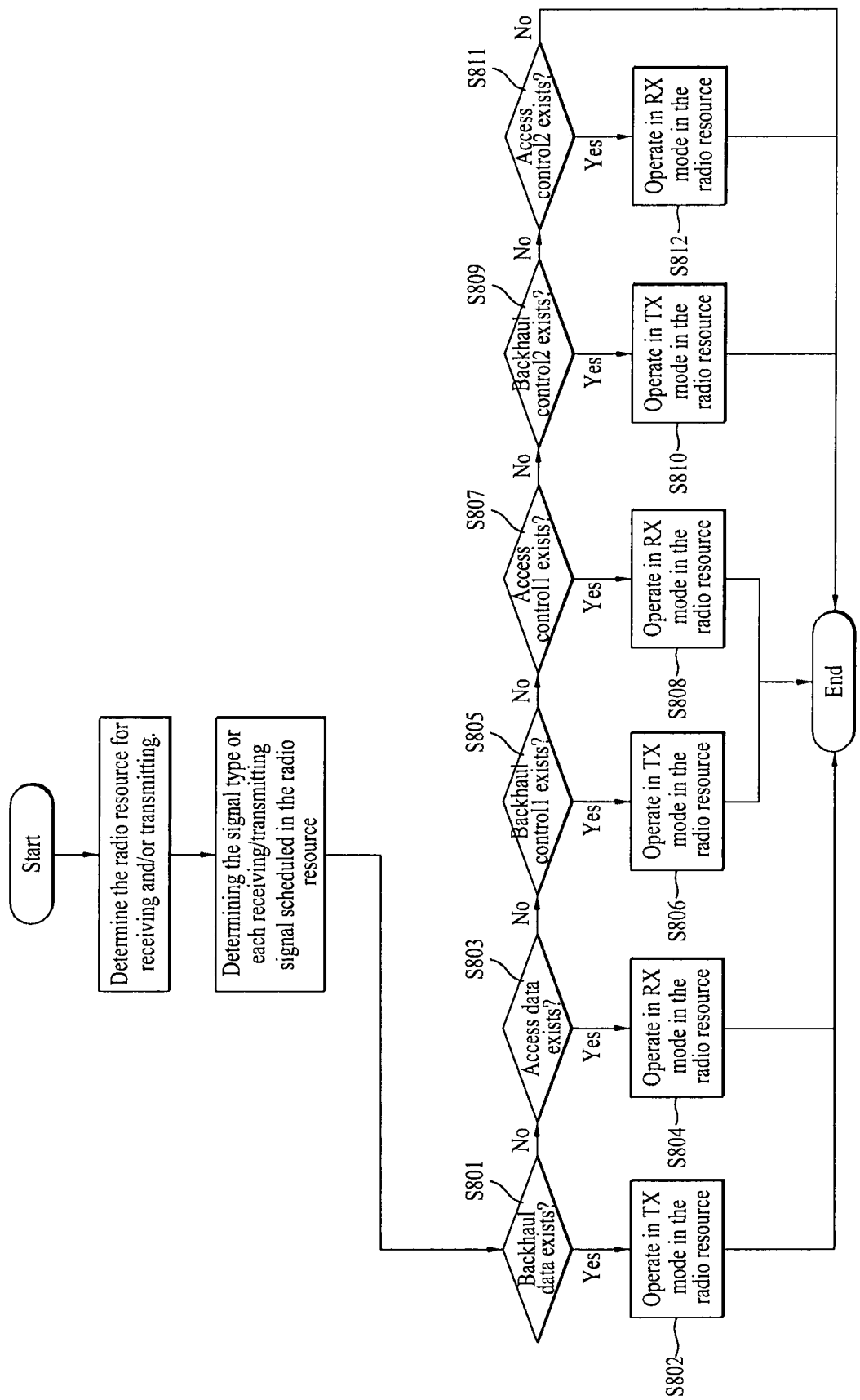
FIG. 8 is a flowchart for RN operation according to another embodiment of the present invention.

FIG. 8 is a flowchart for RN operation according to the embodiment 2.

Since RN may have various signals scheduled to transmit and/or to receive in a given radio resource (at a given subframe on a given frequency band), determining the radio resource for receiving and/or transmitting is performed. Then, determining the signal type of each receiving/transmitting signal scheduled in the given radio resource is performed in order to determine priority of scheduled signals.

First, it is determined whether the signal type of Backhaul Data is scheduled in the given radio resource (S801). If the signal type of Backhaul Data is scheduled in the given radio resource, RN operates in TX mode in the radio resource (S802).

If the signal type of Backhaul Data is not scheduled in the given radio resource, then it is determined whether the signal type of Access Data is scheduled in the given radio resource (S803). If the signal type of Access Data is scheduled in the given radio resource, RN operates in RX mode in the radio resource (S804).

If the signal type of Access Data is not scheduled in the given radio resource, then it is determined whether the signal type of Backhaul Control 1 is scheduled in the given radio resource (S805). If the signal type of Backhaul Control 1 is scheduled in the given radio resource, RN operates in TX mode in the radio resource (S806).

If the signal type of Backhaul Control 1 is not scheduled in the given radio resource, then it is determined whether the signal type of Access Control 1 is scheduled in the given radio resource (S807). If the signal type of Access Control 1 is scheduled in the given radio resource, RN operates in RX mode in the radio resource (S808).

If the signal type of Access Control 1 is not scheduled in the given radio resource, then it is determined whether the signal type of Backhaul Control 2 is scheduled in the given radio resource (S809). If the signal type of Backhaul Control 2 is scheduled in the given radio resource, RN operates in TX mode in the radio resource (S810).

If the signal type of Backhaul Control 2 is not scheduled in the given radio resource, then it is determined whether the signal type of Access Control 2 is scheduled in the given radio resource (S811). If the signal type of Access Control 2 is scheduled in the given radio resource, RN operates in RX mode in the radio resource (S812).

If the signal type of Access Control 2 is not scheduled in the given radio resource, RN may terminate the signal prioritizing operation in the given radio resource.

Embodiment 3

Embodiment 3 defines the signal priority as follows: Backhaul data>Backhaul control 1>Backhaul control 2>Access data>Access control 1>Access control 2

In embodiment 3, backhaul signals have higher priority than any type of access link signals. Thus, RN ignores any signal transmitted from its subordinate Relay-UEs at a subframe and transmits backhaul signal if any type of backhaul transmission is scheduled at that subframe.

According to prioritization scheme of embodiment 3, RN may clearly determine its operation mode at a certain time slot (subframe) and may not suffer conflict between backhaul uplink signal transmission and access uplink reception on the same frequency band.

RN's operation mode in this embodiment is summarized in Table 3.

If the signal type of Backhaul Data is not scheduled in the given radio resource, then it is determined whether the signal type of Backhaul Control 1 is scheduled in the given radio resource (S903). If the signal type of Backhaul Control 1 is scheduled in the given radio resource, RN operates in TX mode in the radio resource (S904).

If the signal type of Backhaul Control 1 is not scheduled in the given radio resource, then it is determined whether the signal type of Backhaul Control 2 is not scheduled in the given radio resource (S905). If the signal type of Backhaul Control 2 is scheduled in the given radio resource, RN operates in TX mode in the radio resource (S906).

If the signal type of Backhaul Control 2 is not scheduled in the given radio resource, then it is determined whether the signal type of Access Data is scheduled in the given radio resource (S907). If the signal type of Access Data is scheduled in the given radio resource, RN operates in RX mode in the radio resource (S908).

If the signal type of Access Data is not scheduled in the given radio resource, then it is determined whether the signal type of Access Control 1 is not scheduled in the given radio resource (S909). If the signal type of Access Control 1 is scheduled in the given radio resource, RN operates in RX mode in the radio resource (S910).

If the signal type of Access Control 1 is not scheduled in the given radio resource, then it is determined whether the signal type of Access Control 2 is scheduled in the given radio resource (S911). If the signal type of Access Control 2 is scheduled in the given radio resource, RN operates in RX mode in the radio resource (S912).

TABLE 3

|  | Backhaul data | Backhaul Control 1 | Backhaul Control 2 | Access data | Access control 1 | Access control 2 | RN operation mode |
|---|---|---|---|---|---|---|---|
| 3-(1) | X | X | X | X | X | ○ | RX |
| 3-(2) | X | X | X | X | ○ | — | RX |
| 3-(3) | X | X | X | ○ | — | — | RX |
| 3-(4) | X | X | ○ | X | X | ○ | TX |
| 3-(5) | X | X | ○ | X | ○ | — | TX |
| 3-(6) | X | X | ○ | ○ | — | — | TX |
| 3-(7) | X | ○ | — | X | X | ○ | TX |
| 3-(8) | X | ○ | — | X | ○ | — | TX |
| 3-(9) | X | ○ | — | ○ | — | — | TX |
| 3-(10) | ○ | — | — | X | X | ○ | TX |
| 3-(11) | ○ | — | — | X | ○ | — | TX |
| 3-(12) | ○ | — | — | ○ | — | — | TX |

Figure 9:
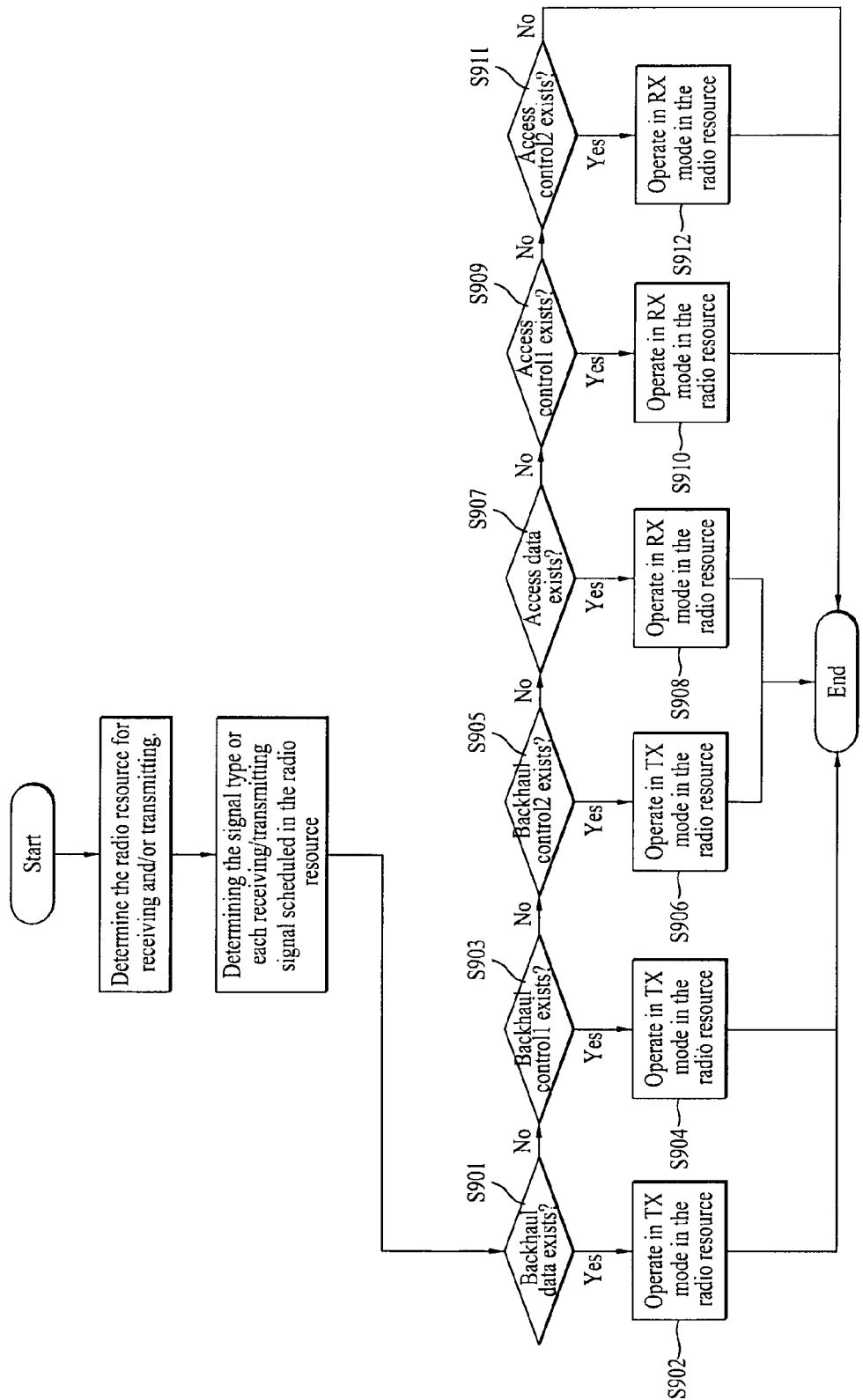
FIG. 9 is a flowchart for RN operation according to still another embodiment of the present invention.

FIG. 9 is a flowchart for RN operation according to the embodiment 3.

Since RN may have various signals scheduled to transmit and/or to receive in a given radio resource (at a given subframe on a given frequency band), determining the radio resource for receiving and/or transmitting is performed. Then, determining the signal type of each receiving/transmitting signal scheduled in the given radio resource is performed in order to determine priority of scheduled signals.

First, it is determined whether the signal type of Backhaul Data is scheduled in the given radio resource (S901). If the signal type of Backhaul Data is scheduled in the given radio resource, RN operates in TX mode in the radio resource (S902).

If the signal type of Access Control 2 is not scheduled in the given radio resource, RN may terminate the signal prioritizing operation in the given radio resource.

Embodiment 4

Embodiment 4 defines the signal priority as follows:
Backhaul data>Access data>Backhaul control 1>Backhaul control 2>Access control 1>Access control 2

In embodiment 4, access data has higher priority but any access control signal has lower priority than backhaul control signals. Thus, if RN is scheduled to transmit backhaul Control 2 (CSI feedback and/or SRS) at a subframe where a subordinate Relay-UE transmits access link Control 1 (ACK/NACK and/or SR), RN transmits the backhaul signal while ignoring the access link signal reception. However, if access link Data (PUSCH) is scheduled together at that subframe, RN receives the access link signal while ignoring the backhaul transmission.

According to prioritization scheme of embodiment 4, RN may clearly determine its operation mode at a certain time slot (subframe) and may not suffer conflict between backhaul uplink signal transmission and access uplink reception on the same frequency band.

RN's operation mode in this embodiment is summarized in Table 4.

TABLE 4

|  | Backhaul data | Backhaul Control 1 | Backhaul Control 2 | Access data | Access control 1 | Access control 2 | RN operation mode |
|---|---|---|---|---|---|---|---|
| 4-(1) | X | X | X | X | X | ○ | RX |
| 4-(2) | X | X | X | X | ○ | — | RX |
| 4-(3) | X | X | X | ○ | — | — | RX |
| 4-(4) | X | X | ○ | X | X | ○ | TX |
| 4-(5) | X | X | ○ | X | ○ | — | TX |
| 4-(6) | X | X | ○ | ○ | — | — | RX |
| 4-(7) | X | ○ | — | X | X | ○ | TX |
| 4-(8) | X | ○ | — | X | ○ | — | TX |
| 4-(9) | X | ○ | — | ○ | — | — | RX |
| 4-(10) | ○ | — | — | X | X | ○ | TX |
| 4-(11) | ○ | — | — | X | ○ | — | TX |
| 4-(12) | ○ | — | — | ○ | — | — | TX |

Figure 10:
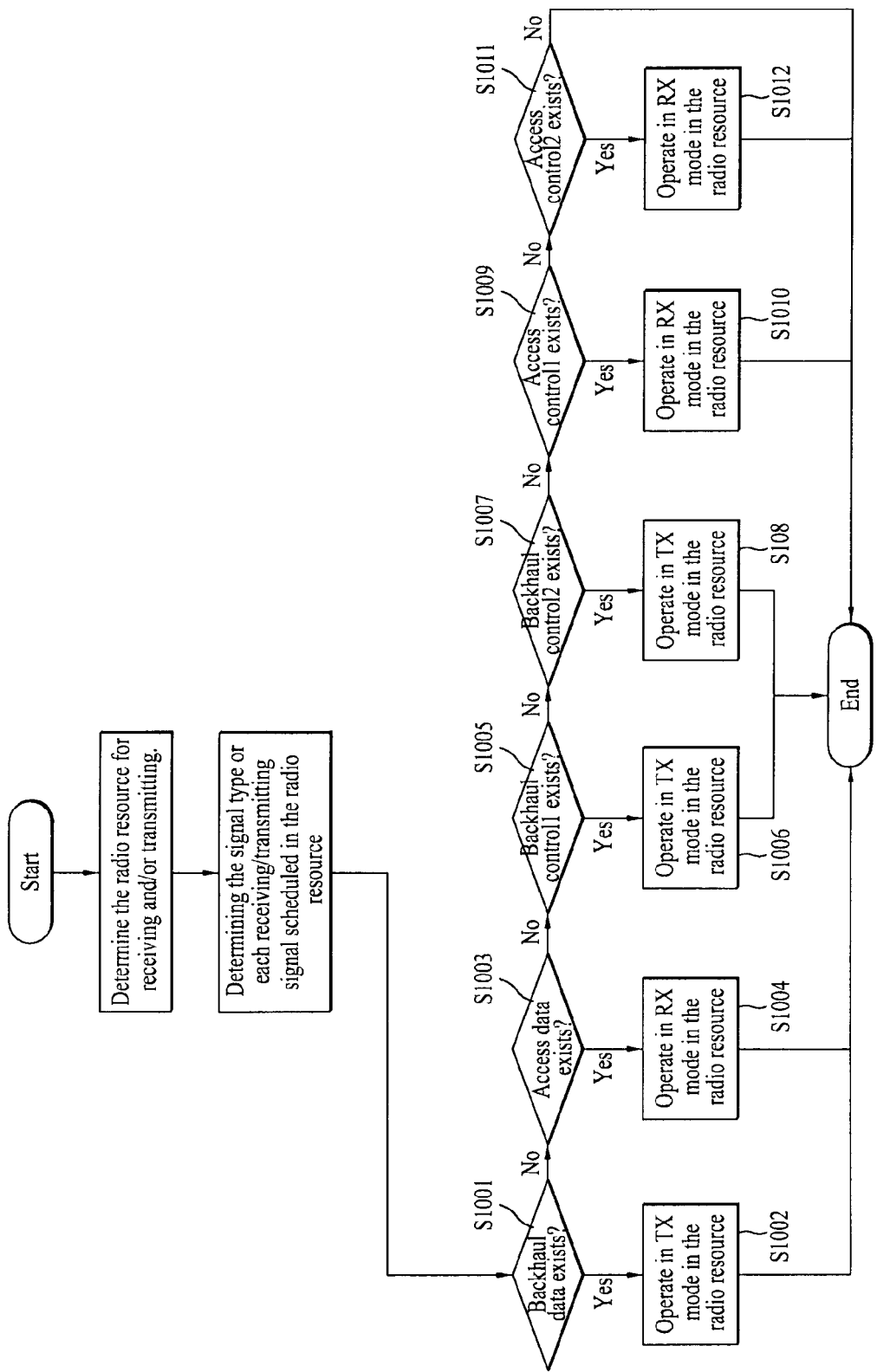
FIG. 10 is a flowchart for RN operation according to still another embodiment of the present invention.

FIG. 10 is a flowchart for RN operation according to the embodiment 4.

Since RN may have various signals scheduled to transmit and/or to receive in a given radio resource (at a given subframe on a given frequency band), determining the radio resource for receiving and/or transmitting is performed. Then, determining the signal type of each receiving/transmitting signal scheduled in the given radio resource is performed in order to determine priority of scheduled signals.

First, it is determined whether the signal type of Backhaul Data is scheduled in the given radio resource (S1001). If the signal type of Backhaul Data is scheduled in the given radio resource, RN operates in TX mode in the radio resource (S1002).

If the signal type of Backhaul Data is not scheduled in the given radio resource, then it is determined whether the signal type of Access Data is scheduled in the given radio resource (S1003). If the signal type of Access Data is scheduled in the given radio resource, RN operates in RX mode in the radio resource (S1004).

If the signal type of Access Data is not scheduled in the given radio resource, then it is determined whether the signal type of Backhaul Control 1 is scheduled in the given radio resource (S1005). If the signal type of Backhaul Control 1 is scheduled in the given radio resource, RN operates in TX mode in the radio resource (S1006).

If the signal type of Backhaul Control 1 is not scheduled in the given radio resource, then it is determined whether the signal type of Backhaul Control 2 is not scheduled in the given radio resource (S1007). If the signal type of Backhaul Control 2 is scheduled in the given radio resource, RN operates in TX mode in the radio resource (S1008).

If the signal type of Backhaul Control 2 is not scheduled in the given radio resource, then it is determined whether the signal type of Access Control 1 is scheduled in the given radio resource (S1009). If the signal type of Access Control 1 is scheduled in the given radio resource, RN operates in RX mode in the radio resource (S1010).

If the signal type of Access Control 1 is not scheduled in the given radio resource, then it is determined whether the signal type of Access Control 2 is scheduled in the given radio resource (S1011). If the signal type of Access Control 2 is scheduled in the given radio resource, RN operates in RX mode in the radio resource (S1012).

If the signal type of Access Control 2 is not scheduled in the given radio resource, RN may terminate the signal prioritizing operation in the given radio resource.

Following embodiment 5 and 6 of the present invention provide criteria for priority selection of RN operation.

Embodiment 5

In embodiment 5, RN may measure the degree of utilization (usage or load) of the access link and determine priority between Backhaul Control 1 (backhaul control signal related to backhaul data transmission) and Access Data. The degree of utilization of the access link is the portion of the resources occupied by the actual signal transmission of the access link, and can be measured based on one or more of the number of Relay-UEs connected to the RN, the traffic intensity of the Relay-UEs, or the access link quality, etc.

In addition, the measurement of the access link utilization can be a relative one. For example, utilization of access link can be normalized by the backhaul resource availability.

The degree of utilization of access link may be compared to a predetermined threshold to determine priority between Backhaul Control 1 and Access Data. Specifically, if the access link utilization is equal or lower than the threshold, RN gives a higher priority to Backhaul Control 1 than that given to Access Data. In other words, RN drops the Access Data transmission/reception if it is scheduled to transmit/receive Backhaul Control 1 at a given subframe. Such RN operation can be allowed because the resource demand for the access link is not high and it can improve the backhaul link efficiency by avoiding unnecessary retransmission in the backhaul link. Thus, RN may operate according to signal priority defined in Embodiment 1 (Backhaul Data>Backhaul Control 1>Access Data>Access Control 1>Backhaul Control 2>Access Control 2) or Embodiment 3 (Backhaul data>Backhaul control 1>Backhaul control 2>Access data>Access control 1>Access control 2).

If the access link utilization is higher than the threshold, RN gives a higher priority to Access Data than that given to Backhaul Control 1. Thus, RN may operate according to signal priority defined in Embodiment 2 (Backhaul data>Access data>Backhaul control 1>Access control 1>Backhaul control 2>Access control 2) or Embodiment 4

(Backhaul data>Access data>Backhaul control 1>Backhaul control 2>Access control 1>Access control 2).

Embodiment 6

The eNB to which RN is connected sends the configuration message of the Backhaul Control 2 (e.g., periodic CQI feedback configuration, SRS transmission configuration) to RN. The RN's feedback/transmission period for Backhaul Control 2 is a parameter included in the configuration message from eNB.

RN may compare feedback/transmission period for Backhaul Control 2 with a predetermined threshold value and determine priority between Backhaul Control 2 and Access Data or Access Control 1. Specifically, if the feedback/transmission period for Backhaul Control 2 is higher than the threshold (infrequent Backhaul Control 2 transmission opportunity), RN gives a higher priority to Backhaul Control 2 than that given to Access Data or Access Control 1. Such RN operation can avoid the loss of feedback/transmission opportunity for Backhaul Control signal which is given to RN infrequently. Thus, RN may operate according to signal priority defined in Embodiment 3 (Backhaul data>Backhaul control 1>Backhaul control 2>Access data>Access control 1>Access control 2) or Embodiment 4 (Backhaul data>Access data>Backhaul control 1>Backhaul control 2>Access control 1>Access control 2).

If the feedback/transmission period for Backhaul Control 2 is equal or lower than the threshold (frequent Backhaul Control 2 transmission opportunity), RN gives a higher priority to Access Data or Access Control 1 than that given to Backhaul Control 2. Thus, RN may operate according to signal priority defined in Embodiment 1 (Backhaul Data>Backhaul Control 1>Access Data>Access Control 1>Backhaul Control 2>Access Control 2) or Embodiment 2 (Backhaul data>Access data>Backhaul control 1>Access control 1>Backhaul control 2>Access control 2).

Both of the embodiments 5 and 6 can be simultaneously considered as the prioritization criterion, which is summarized in Table 5.

TABLE 5

|  | Low access link utilization | High access link utilization |
| --- | --- | --- |
| Frequent Backhaul Control 2 transmission opportunity | Embodiment 1 | Embodiment 2 |
| Infrequent Backhaul Control 2 transmission opportunity | Embodiment 3 | Embodiment 4 |

Figure 11:
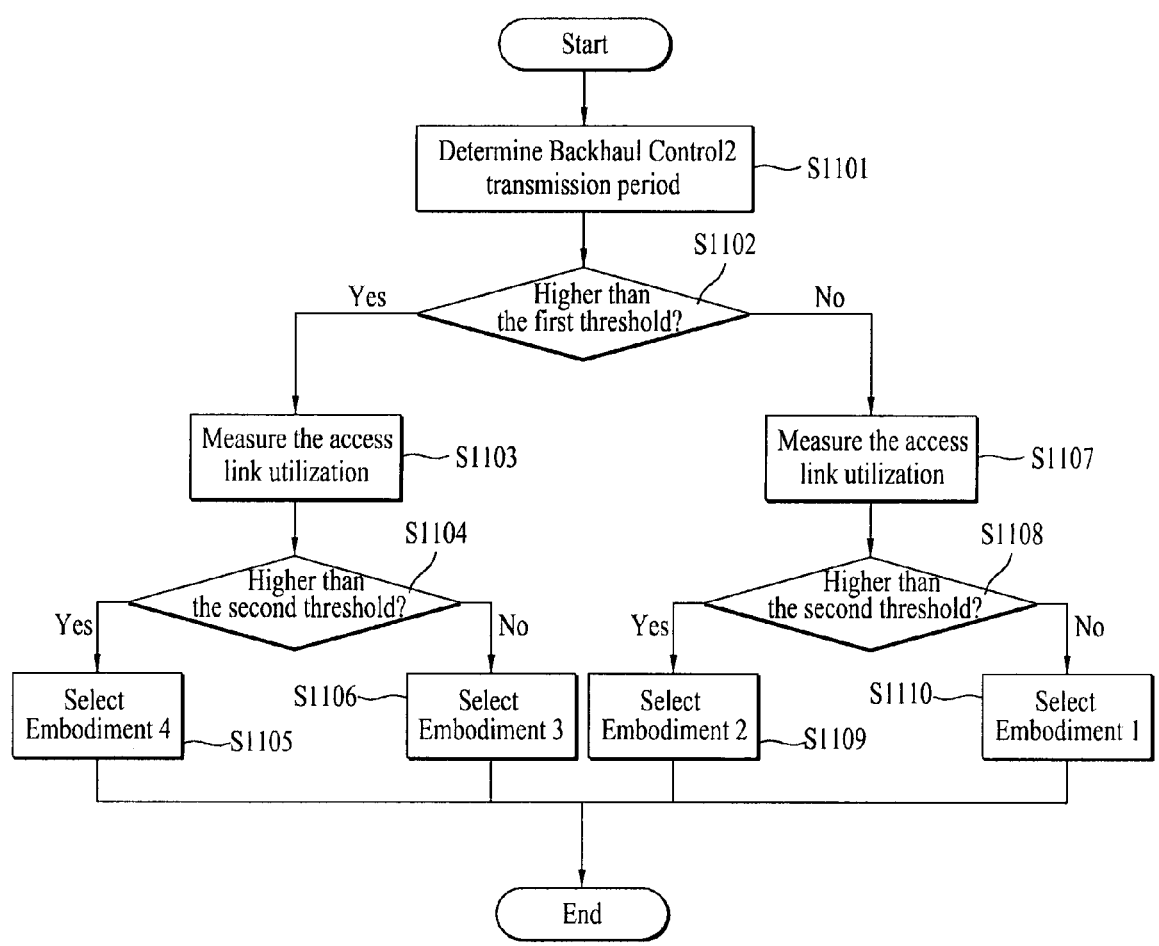
FIG. 11 is a flowchart for RN operation according to an embodiment of the present invention.

Referring to FIG. 11, RN's operation according to the prioritization criteria in Table 5 is described.

In S1101, RN determines period of transmission of Backhaul Control 2 (e.g. backhaul link CSI and/or SRS) from configuration message received from eNB. In S1102, RN compares determined period of transmission of Backhaul Control 2 to a predetermined first threshold value, according to embodiment 6. If the period of transmission of Backhaul Control 2 is higher than the first threshold (the result of comparison in S1102 is 'Yes'), RN determines that infrequent Backhaul Control 2 transmission opportunity is configured to RN, then proceed to S1103.

In S1103, RN further measures the degree of utilization of the access link. In S1104, RN compares measured access link utilization to a predetermined second threshold value, according to embodiment 5.

If the access link utilization is higher than the second threshold (the result of comparison in S1104 is 'Yes'), RN selects signal priority defined in Embodiment 4 (Backhaul data>Access data>Backhaul control 1>Backhaul control 2>Access control 1>Access control 2), and operate accordingly (S1105).

If the access link utilization is equal or lower than the second threshold (the result of comparison in S1104 is 'No'), RN selects signal priority defined in Embodiment 3 (Backhaul data>Backhaul control 1>Backhaul control 2>Access data>Access control 1>Access control 2), and operate accordingly (S1106).

Meanwhile, in S1102, if the period of transmission of Backhaul Control 2 is equal or lower than the first threshold (the result of comparison in S1102 is 'No'), RN determines that frequent Backhaul Control 2 transmission opportunity is configured to RN, then proceed to S1107.

In S1107, RN further measures the degree of utilization of the access link. In S1108, RN compares measured access link utilization to a predetermined second threshold value, according to embodiment 5.

If the access link utilization is higher than the second threshold (the result of comparison in S1108 is 'Yes'), RN selects signal priority defined in Embodiment 2 (Backhaul data>Access data>Backhaul control 1>Access control 1>Backhaul control 2>Access control 2), and operate accordingly (S1109).

If the access link utilization is equal or lower than the second threshold (the result of comparison in S1108 is 'No'), RN selects signal priority defined in Embodiment 1 (Backhaul Data>Backhaul Control 1>Access Data>Access Control 1>Backhaul Control 2>Access Control 2), and operate accordingly (S1110).

According to prioritization criterion of embodiment 5 and/or embodiment 6, RN may further clearly determine its operation mode at a certain time slot (subframe) and may not suffer conflict between backhaul uplink signal transmission and access uplink reception on the same frequency band.

Hereinafter, an apparatus for implementing the above-described embodiments will be described.

In a wireless communication system, a RN may include a receiving module, a transmitting module, a processor, a memory unit, multiple antennas and the like. The configuration of the RN for performing prioritizing operation of transmission and reception of backhaul link and access link signals according to embodiments of the present invention will be described in detail.

Figure 12:
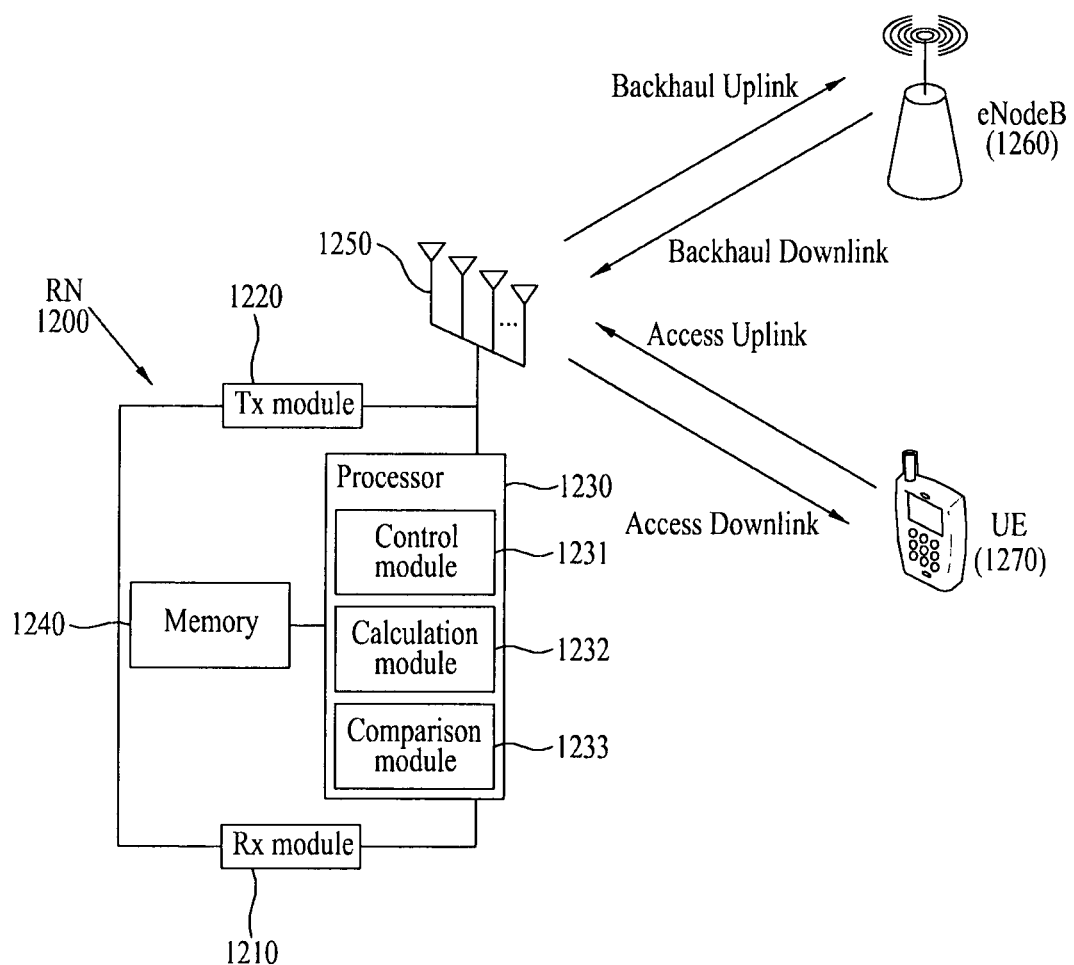
FIG. 12 is a diagram illustrating the configuration of RN according to an embodiment of the present invention.

FIG. 12 is a diagram showing the configuration of RN according to an embodiment of the present invention.

RN 1200 may comprise a receiving (Rx) module 1210, a transmitting (Tx) module 1220, a processor 1230, a memory unit 1240 and multiple antennas 1250. RN 1200 may be wirelessly connected to eNB 1260. Backhaul Downlink is a radio link from eNB 1260 to RN 1200, and Backhaul Uplink is a radio link from RN 1200 to eNB 1260. Further, RN 1200 may be wirelessly connected to UE 1270. Access Downlink is a radio link from RN 1200 to UE 1270, and Access Uplink is a radio link from UE 1270 to RN 1200.

The processor 1230 is communicably connected to other elements (Rx module 1210, a Tx module 1220, a memory unit 1240 and multiple antennas 1250). The processor 1230 may comprise various functional modules, and among them, control module 1231, calculation module 1232 and comparison module 1233 are shown in FIG. 12. Control module 1231 is configured to control the operation of other elements of RN 1200. Specifically, Control module 1231 is configured to control Rx module 1210 and Tx module 1220 to receive and transmit backhaul link and access link signals according to priority of the signals. Calculation module 1232 is configured to measure access link utilization, to determine control signal transmission period indicated by eNB, etc. Comparison module 1233 is configured to perform comparison among various values, for example, between control signal period and a predetermined threshold value, or between measured access link utilization and a predetermined threshold value.

The memory unit 1240 may store and update information related to RN operation. For example, calculated result from calculation module 1232, signal priority order (defined as above embodiments 1 to 4), and the like.

From the perspective of UE 1270, RN 1200 appears as a separate eNB to UE 1270. UE 1270 is configured to receive scheduling information and HARQ feedback directly from RN 1200 and to send its control channel (SR, ACK/NACK, CQI, SRS, etc.) to RN 1200. Thus, backward compatibility can be achieved for UEs which do not take into account RN's existence in wireless communication network.

According to an embodiment of present invention, uplink signal from UE 1270 to RN 1200 may be categorized into three types of signal, data (PUSCH), control signal related to data transmission (ACK/NACK and/or SR), control signal related to channel state information (CQI feedback and/or SRS).

Transmission from UE 1270 to RN 1200 is scheduled by RN 1200 (which appears as eNB to UE 1270). Receiving scheduling information from RN 1200, UE 1270 is configured to have, transmission priority according to the order of data, control signal related to data transmission and control signal related to channel state information. UE 1270 is further configured to transmit data (PUSCH) or control signal related to UE data transmission (ACK/NACK and/or SR) at a given subframe, if neither data nor control signal related to the data transmission from RN 1200 to eNB 1260 is scheduled. UE 1270 is further configured to transmit control signal related to channel state information (CQI feedback and/or SRS), if none of data, control signal related to the data transmission and control signal related to channel state information from RN 1200 to eNB 1260 is scheduled.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone. Moreover, examples of the mobile station include a personal digital assistant (PDA), a hand-held PC, a notebook PC, a smart phone, and a multimode-multiband (MM-MB) terminal.

The embodiments according to the present invention can be implemented by various means, for example, hardware, firmware, software, or their combination.

If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiment of the present invention can be implemented by a type of a module, a procedure, or a function, which performs functions or operations described as above. For example, a software code may be stored in a memory unit, and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to various wireless communication systems. Examples of the various wireless access systems include 3GPP LTE system, 3GPP LTE-A system, 3GPP2 system and/or IEEE 802.xx system. The embodiments of the present invention can be applied to all technical fields to which the various access systems are applied, as well as the various access systems.

The invention claimed is:

1. A method for transmitting a signal from a Relay Node (RN) to an eNodeB (eNB) in a wireless communication system, the method comprising:
   receiving, by the RN from the eNB, configuration information about plural subframes for a transmission from the RN to the eNB;
   determining, by the RN, an uplink subframe for transmitting a Scheduling Request (SR) from the RN to the eNB from among the plural subframes, the plural subframes being different in time from a subframe that is configured by the RN for a reception from a User Equipment (UE) by the RN, the SR being a request to schedule uplink transmissions from the RN to eNB;
   transmitting, by the RN to the eNB, data in the plural subframes,
   wherein the SR is simultaneously transmitted with the data by the RN to the eNB only in the determined uplink subframe of the plural subframes.

2. The method of claim 1, wherein the determined uplink subframe is configured for a Physical Uplink Shared Channel (PUSCH) transmission from the RN to the eNB.

3. The method of claim 2, wherein the PUSCH transmission from the RN to the eNB is configured by a Relay-Physical Downlink Control Channel (R-PDCCH).

4. The method of claim 1, wherein the subframe configured for the reception from the UE to the RN is configured for a PUSCH transmission from the UE to the RN.

5. The method of claim 1, wherein the SR is multiplexed with HARQ (hybrid automatic repeat request) acknowledgement information to form multiplexed control information prior to transmitting the SR.

6. A Relay Node (RN) in a wireless communication system that includes an eNodeB (eNB), the RN comprising:
   a receiver;
   a transmitter; and
   a processor connected to the receiver and the transmitter and configured to
      receive, from the eNB, configuration information about plural subframes for a transmission from the RN to the eNB;

determine an uplink subframe for transmitting a Scheduling Request (SR) from the RN to the eNB from among the plural subframes, the plural subframes being different in time from a subframe that is configured by the RC for a reception from a User Equipment (UE) by the RN, the SR being a request to schedule uplink transmissions from the RN to eNB;

transmit data in the plural subframes, wherein the SR is simultaneously transmitted with the data by the RN to the eNB only in the determined uplink subframe of the plural subframes.

7. The RN of claim 6, wherein the determined uplink subframe is configured for a Physical Uplink Shared Channel (PUSCH) transmission from the RN to the eNB.

8. The RN of claim 7, wherein the PUSCH transmission from the RN to the eNB is configured by a Relay-Physical Downlink Control Channel (R-PDCCH).

9. The RN of claim 6, wherein the subframe configured for the reception from the UE to the RN is configured for a PUSCH transmission from the UE to the RN.

10. The RN of claim 6, wherein the SR is multiplexed with HARQ (hybrid automatic repeat request) acknowledgement information to form multiplexed control information prior to a transmission of the SR by the processor.

* * * * *